United States Patent [19]

Wright

[11] Patent Number: 5,551,969

[45] Date of Patent: Sep. 3, 1996

[54] CONTINUOUS COMPOSTER

[76] Inventor: James Wright, 511 Woodland Acres Crescent, R.R. #2, Maple, Ontario, Canada, L6A 1G2

[21] Appl. No.: 454,469

[22] Filed: May 30, 1995

Related U.S. Application Data

[63] Continuation of Ser. No. 188,784, Jan. 31, 1994, abandoned, which is a continuation-in-part of Ser. No. 17,613, Feb. 11, 1993, Pat. No. 5,409,831.

[51] Int. Cl.$^6$ ........................................................ C05F 9/04
[52] U.S. Cl. ............................................. 71/9; 435/294.1
[58] Field of Search .......................... 71/8, 9; 422/184; 435/287, 299, 300, 290.1, 293.1, 294.1; 134/82, 126

[56] References Cited

FOREIGN PATENT DOCUMENTS

| | | | |
|---|---|---|---|
| 2704482 | 1/1979 | Germany | 71/9 |
| 2844481 | 4/1980 | Germany | 71/9 |
| 3401889 | 7/1985 | Germany | 71/8 |

*Primary Examiner*—Ferris Lander
*Attorney, Agent, or Firm*—Jane Parsons

[57] ABSTRACT

A method of continuous composting is carried out in a train of composting trays in an elongate enclosed tunnel. Garbage is deposited into the composting tunnel via a blending trough in which blending augers blend the garbage. The trough then tilts to empty the garbage into an inlet in the top surface of the tunnel to fill an upstream one of the trays. A ram shunts the trays stepwise through the tunnel. The tracks may be U-channels, the webs of which are connected to tunnel sidewalls. The trays rest on one of the legs of the U and the other leg of the U extends over the edge of the tray to protect it from being fouled by garbage. During passage of the trays through the tunnel, the garbage may be mixed by mixers for loosening and aeration of the garbage. Such mixing may have directional components in both longitudinal and transverse directions of the tunnel. Water may be added immediately downstream of the mixing for the purpose of optimizing composting conditions. The water may be added into spray curtains from spaced apart spray bars above and immediately downstream of the mixers. The invention also includes a continuous composter having an blending trough for blending the garbage and for tilting so that the blended garbage falls into an upstream tray.

7 Claims, 9 Drawing Sheets

CONTINUOUS COMPOSTER

RELATED APPLICATIONS

This application is a continuation of U.S. patent application Ser. No. 08/188,784 filed Jan. 31, 1994 now abandoned which is a continuation-in-part of U.S. patent application Ser. No. 08/017,613 which was filed on Feb. 11, 1993 and is now U.S. Pat. No. 5,409,831, Apr. 25, 1995.

BACKGROUND OF THE INVENTION

1. Field of the Invention

This invention relates to a method of composting garbage.

2. Acknowledgement of Prior Art

At least since environmental considerations have drawn attention to the undesirability of disposing of garbage as landfill, composting has increased in importance. Various industrial and small scale composting systems have been developed to take the place of the traditional back-yard compost heap.

Proposals have been made for continuous composting apparatus into which garbage is loaded at one end and from which compost emerges at another end. Such apparatus, especially large scale apparatus, has met with problems in advancing the garbage through the apparatus.

An example of such apparatus comprises a tunnel having a feed hopper above one end and an exit at the other end. At the feed end a ram is used at intervals to force the composting garbage through the tunnel over a stationary floor. The ram has a tendency to pack the garbage and thus inhibit aeration, which is necessary for successful composting.

Another system of composting which does allow for the necessary aeration involves pulling composting garbage through a tunnel by means of a net. This system, however, is a batch system and it is necessary to complete one batch of compost before starting another.

Frequently, in known composting systems, stench creates a problem. It is not considered desirable for health or aesthetic reasons to use open composting systems since the smells of rotting garbage may give rise to health problems as well as being unpleasant.

Removal and recycling of noxious gases has also provided problems in the past. Tunnel composters such as that described above merely vent the issuing gases.

The present applicant has addressed the problem of providing a continuous composting system suitable for large or small scale composting of food garbage with or without the addition of other less easily compostable materials such as wood chips or even rubber. In particular, he has addressed the problem of providing proper aeration, avoiding compaction of the composting garbage and inhibiting the unpleasant smells associated with composting.

SUMMARY OF THE INVENTION

According to the invention there is provided a continuous composter comprising: an enclosed elongate tunnel having a first upstream end and a second downstream end; an inlet for garbage in a top surface of the tunnel in the region of the first end; an outlet for compost in the second end; a conveyor track raised from a floor of the tunnel and extending along the length of the tunnel; a train of conveyor trays to travel shuntwise on the conveyor track, each tray having a shunting frame to receive directional shunting force and each tray having a foraminous carrier surface to allow aeration of material in the tray; a ram having a stroke in the direction of an elongate axis of the tunnel, the length of the stroke being equal to a chosen length of shunting step of the conveyor trays, the ram being located to act against the shunting frame of the conveyor tray which is furthest upstream. Blending means are provided at the first upstream end of the composter. The blending means comprises a trough comprising an elongate section of a cylinder having an open mouth, a elongate base convex to an outer surface of the trough, the trough being located across the top surface of the tunnel below the inlet for garbage and being tiltable about an elongate axis of the trough between a first position in which the open mouth faces upwardly for reception of garbage into the trough for retention thereon, and a second position in which the open mouth faces downwardly to empty garbage from the trough into the inlet for garbage, the trough having blending augers for blending garbage in the trough.

The trough may be tiltable by means of gear teeth on an outside surface of the trough engaging with complementary gear teeth of drive means therefor.

The blending augers may be driven in opposite directions to mix intimately garbage that is present in the trough. A lid may be provided to close the open top of the trough when it faces upwardly to confine the smell of garbage within the trough. The lid is openable to allow supply of garbage to the trough pivots to empty garbage into its inlet of the tunnel. If the lid is freely hinged at one edge, pivoting of the trough may raise the lid automatically.

The tunnel may have generally parallel sidewalls and the conveyor track may comprise a pair of rails.

The conveyor trays may be generally rectangular in shape, and have a width between the shunting wall and an opposed wall equal to length of the ram stroke. Conveniently, the conveyor trays are provided with slide runners to bear on the conveyor track. Alternatively the rails may have slide surfaces on which the trays may slide. It is, however, more convenient to provide these surfaces the trays since they are more easily inspected for wear. The base of the conveyor trays may be perforated metal sheet or mesh or other foraminous material.

Aeration means are suitably provided to feed air into a space between the tunnel floor and conveyor trays located on the conveyor track so that air rises through the bases of the trays and through material located thereon. Exhaust means are provided in a top surface of the tunnel to vent exhaust gases and spent aeration gases from the tunnel.

Surprisingly, it has been found that the recycling of a portion of the exhaust gases and spent aeration gases is not detrimental to the process. Moreover, such recycling may provide a suitable treatment for the unpleasant smelling gases. The proportions of recycled gas and fresh air may be maintained by computer.

Mixing means may be provided in the tunnel for mixing composting garbage. Such mixing means may comprises mixing rollers extending from side to side of the tunnel and having, for example, paddles for mixing the garbage. The tunnel outlet may be provided with closure means openable by pressure of an advancing conveyor tray such as a freely hinged door. The paddles may be angled to one side or the other of the tunnel to encourage cross mixing of garbage. At any one location two mixing rollers may be provided, one above the other. Each mixing roller may have at least one first paddle having a helical orientation on the roller so as to direct the garbage in one direction and at least one second paddle having an opposite helical orientation to direct garbage in an opposite direction. Preferably, adjacent paddles may have helical twists in opposing directions to direct the garbage in opposing directions with a view to mixing garbage in the transverse direction of the tunnel. Alternatively, each paddle may be an upstanding flap having its plane at right angles to the axis of the roller, a number of flaps being arranged about the roller spaced from one another to form a number of shallow helical bands. Each roller may have at least one first band with a helical orientation to one hand and at least one second band with a helical orientation to the other hand. Immediately downstream of the mixing rollers, before the garbage has had time to settle and compact, water may be added to the garbage in an amount to promote composting. At least one water spray pipe extends across an upper region of the tunnel to spray water in a descending water curtain. Very preferably at least two such pipes for the provision of two water curtains are provided close to one another. The spacing between the pipes may be in the general range of from 9 inches to 12 inches. Of course, it will be appreciated that in a smaller composter the water spray pipes will tend to be closer together.

The invention also includes a method of composting comprising depositing garbage into a composting tunnel through an inlet in a top surface of the tunnel in the region of a first end into a trough comprising an elongate section of a cylinder having an open mouth, an elongate bottom and end walls, the trough being located across the top surface of the tunnel below the inlet for garbage;

moving the trays stepwise within the tunnel by operation of a ram against an upstream shunting surface of the furthest upstream tray, each step being equivalent to the width of a tray, whereby space is created upstream of the trays for location of a further upstream tray and a downstream tray is ejected from an outlet in a second end of the tunnel.

The method may include blending garbage in the trough in a first position of the trough using blending augers extending between the end walls of the trough;

tilting the trough about a longitudinal axis to a second position so that the open mouth faces downwardly to empty garbage into a tray located beneath the trough being the furthest upstream tray of a train of trays on a track running longitudinally within the tunnel, and returning the trough to its first position to receive further garbage.

The method may also include adding water immediately downstream of the mixing rollers in one or preferably two water curtains across the tunnel. Rotational disturbance of the garbage caused by the mixing rollers tends to alleviate compaction of the garbage and the resulting disturbed garbage tends to break up both curtains, so that water is disturbed on the moving garbage.

BRIEF DESCRIPTION OF THE DRAWINGS

An embodiment of the invention will now be described by way of example with reference to the drawings, in which.

DETAILED DESCRIPTION OF THE DRAWINGS

The drawings illustrate a composter 10 comprising a tunnel 12 having a top 13 and a blending hopper trough 14 in an upstream end 16 of top 13. A conveyor 15 lifts garbage to deliver it to the blending hopper trough 14. The downstream end 18 of tunnel 12 has a doorway 20 for outputting compost. Within the tunnel 12, tracks 22 are provided to each side of the tunnel supporting conveyor trays 24a–n. The conveyor trays 24 move stepwise through the tunnel in a longitudinal direction on the conveyor tracks.

Before describing the details of the apparatus it may be useful to describe briefly the operation thereof. A conveyor tray 24a is located on the tracks 22 underneath the blending hopper trough 14. Garbage is added from the conveyor 15 to the blending hopper trough 14 from which it is delivered to a suitable depth in tray 24a, say within a foot of the roof of tunnel 12. The tray 24a is then stepped forward by action of a ram 26 having a stroke sufficient to move tray 24a forward sufficiently to allow space for a further tray 24b. Ram 26 is then withdrawn and tray 24b is inserted between the ram and tray 24a. The number of trays and the length of the tunnel may be such that composting is complete when a tray 24 reaches end 18 of the tunnel. The compost may then be removed from the tray by conveyor 25 and the tray may be returned to the input end. Tray return may be manual or may be automated. When tray return is automated, each tray exiting from a tray exit port 20 may be ejected onto a conveyor to return the tray to a tray entry port 21.

Conveniently, the size of the tunnel and the size of the trays may be such that each tray may take a day's supply of garbage. It is suggested that under good conditions of composting fourteen days will be sufficient to make compost and thus the line of conveyor trays within composter may be fourteen as shown. The operation of the composter will be described in greater detail with reference to the apparatus parts hereinafter.

An elongate rectangular inlet insert 17 upstanding from a complementary opening across the top 13 of the tunnel 12 to extend the depth of blending hopper trough 14. Insert 17 has an open bottom and an open top which may be closed by lid 70 freely hinged along one elongate edge 72. One lower edge 74 of insert 17 below the upper edge 72 has an inturned flange 76. The other lower edge 78 has an inturned flange 80 with a depending lip 82.

Below the insert 17, the blending hopper trough 14, is located to be movable from a first position (see FIG. 6) in which it forms a bottom for insert 17 to a second position (see FIG. 7) in which it allows blended garbage to fall into the tunnel 12. Trough 14 has flanges 84, 86 along its elongate edges. Flange 84, in the first position of trough 14, rests on flange 76 of insert 17 to help support the trough. Flange 86, in its first position of trough 14, abuts flange 78 of insert 17 to help seal the interior of the tunnel 12 from the exterior. Depending lip 82 also helps this seal.

Within the trough 14 blending augers 88 are arranged to be parallel with the axis of the trough. Blending augers 88 are driven by drive means (not shown) to blend fresh garbage in trough 18.

Figure 6:
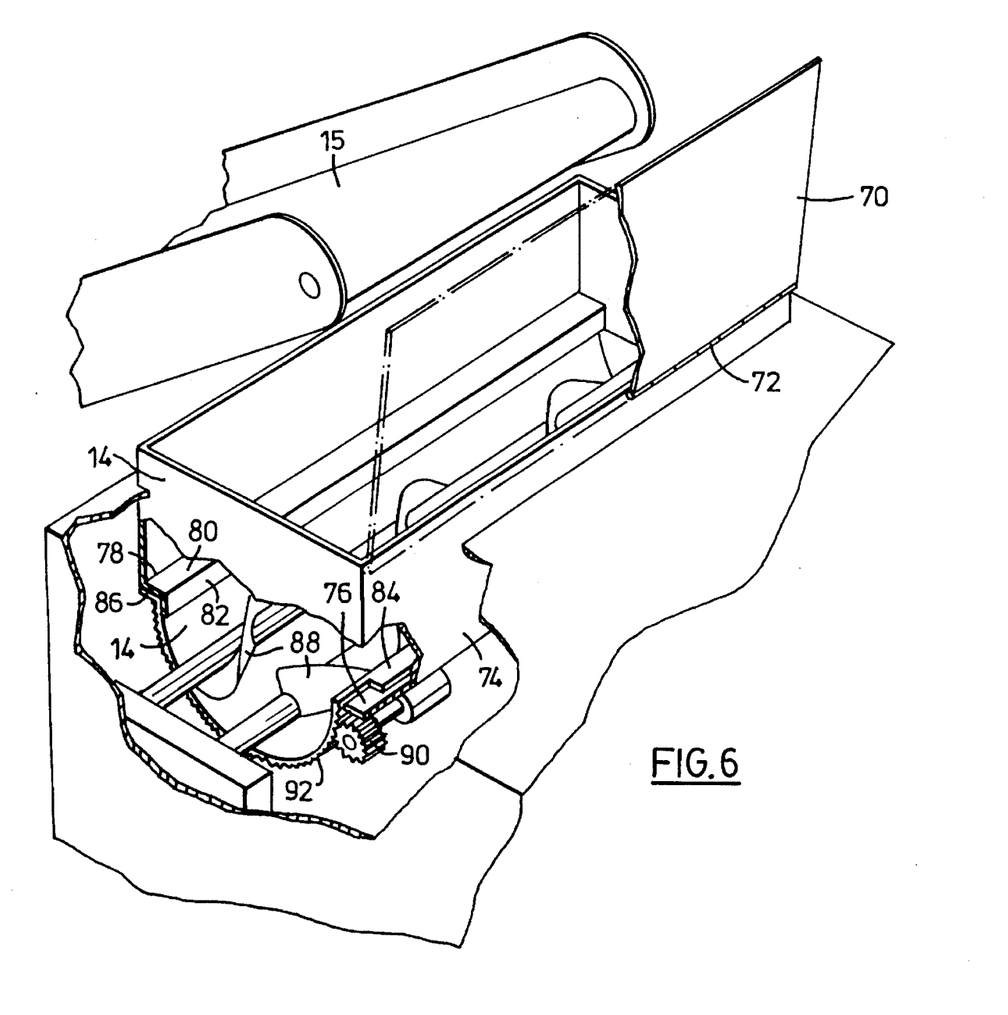
FIG. 6 is shows the blending trough in one position.
Figure 7:
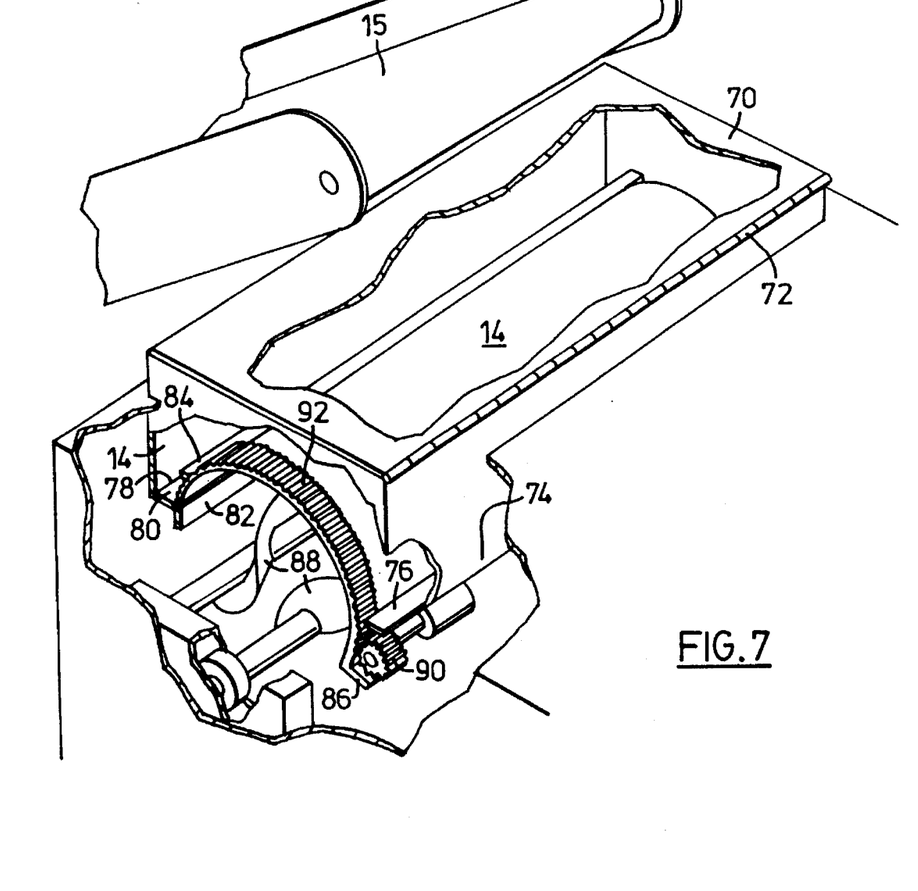
FIG. 7 shows the blending trough in its second position.

When it is considered blending is sufficient, trough 14 is tipped from the position shown in FIG. 6 to the position shown in FIG. 7 by means of gear wheel 90 meshing with gear teeth 92 on the convex surface of trough 14. Gear wheel 90 may be driven by drive means (not shown) to rotate in either direction to move trough 14 between its first and second positions. When the garbage has emptied into the tunnel 12, the trough 14 is returned to its first position and refilled by means of conveyor 15 which projects over it. For refilling lid 70 is opened, either manually or automatically. When trough 14 is in its second position, or during blending of garbage, lid 70 is closed to mitigate any odour rising from decaying compost in the tunnel 12.

The compost loaded into insert 17 and trough 14 may be food garbage which is preferably blended with bulking materials such as newspaper or wood chips. More surprisingly rubber crumb may be blended with food garbage and is subjected to the composting process. This may be a useful way of disposing of rubber waste which currently causes considerable problems. Rubber crumb having a particle size between ¼ and ¾ inch may be used in proportions of up to ⅓ by volume or even more of food garbage.

Each conveyor tray 24 comprises a frame 27 and foraminous surface 28 through which air can access the garbage to be composted. The foraminous surface 28 is located above frame 27. Trays are added to the train or trays at the upstream end of the tunnel 12 through tray entry port 21. Tray 24a, which is acted upon by ram 26 to advance a step within the tunnel, acts on tray 24b downstream of it to advance tray 24b also. Similarly, tray 24b acts on tray 24c. Thus the trays are shunted down the tunnel until tray 24n is shunted out of tray exit port 20 which may, except during exit of a tray, be securely fastened by a door. Since these trays are subject to considerable stresses, initially imparted from ram 26 against the frames 27, these frames 27 are built to withstand these stresses. Sidewalls 30 are of sufficient height to be impacted by the front face of ram 26. Ram 26 conveniently accesses the most upstream frame through tray entry port 21. In practice, it is not necessary that walls 30 should be very high. It is only necessary that they have a vertical area to accommodate the driving face of ram 26 so as to absorb its whole force.

The other pair of tray sidewalls 36 located longitudinally in the tunnel are conveniently made as sturdily sidewalls 32. However, these walls 36 do not have to absorb the full force of the ram against their planes. While considerable crumpling force may be exerted on them in movement of the trays along the tunnel, this force is somewhat mitigated by the presence of garbage in the tray.

The frame 27 comprises two pairs of opposed sidewalls 30, and 36. One pair of these sidewalls 30 extend transversely across the tunnel 12 in upstream and downstream locations. Ram 26 impacts the upstream sidewall 30a directly. Downstream sidewall 30b impacts the next upstream sidewall 30a of tray 24b. Thus, the trays 24 are shunted stepwise in a downstream direction by each stroke of ram 26.

Figure 4:
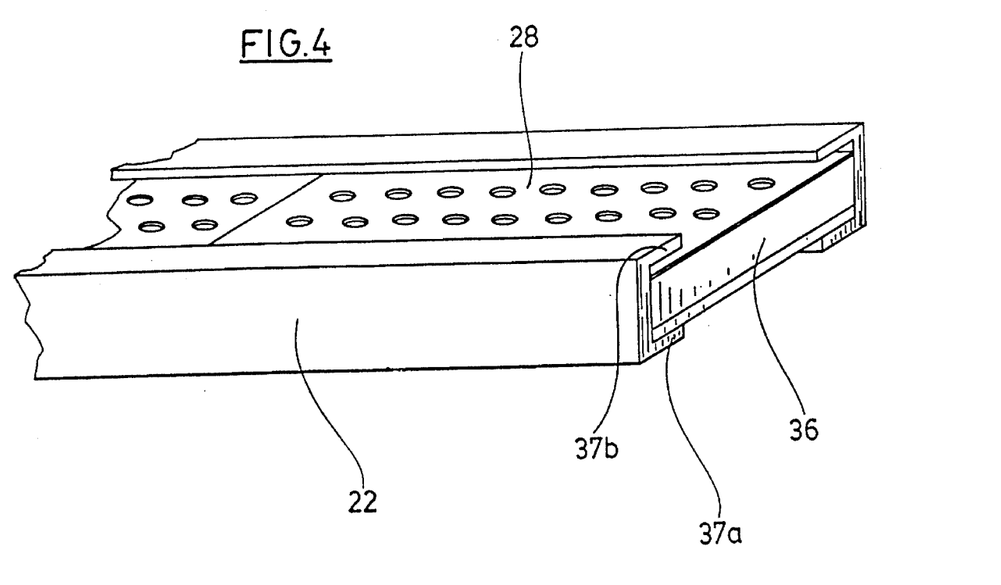
FIG. 4 is a detail showing the movable tray located in a U-channel.
Figure 5:
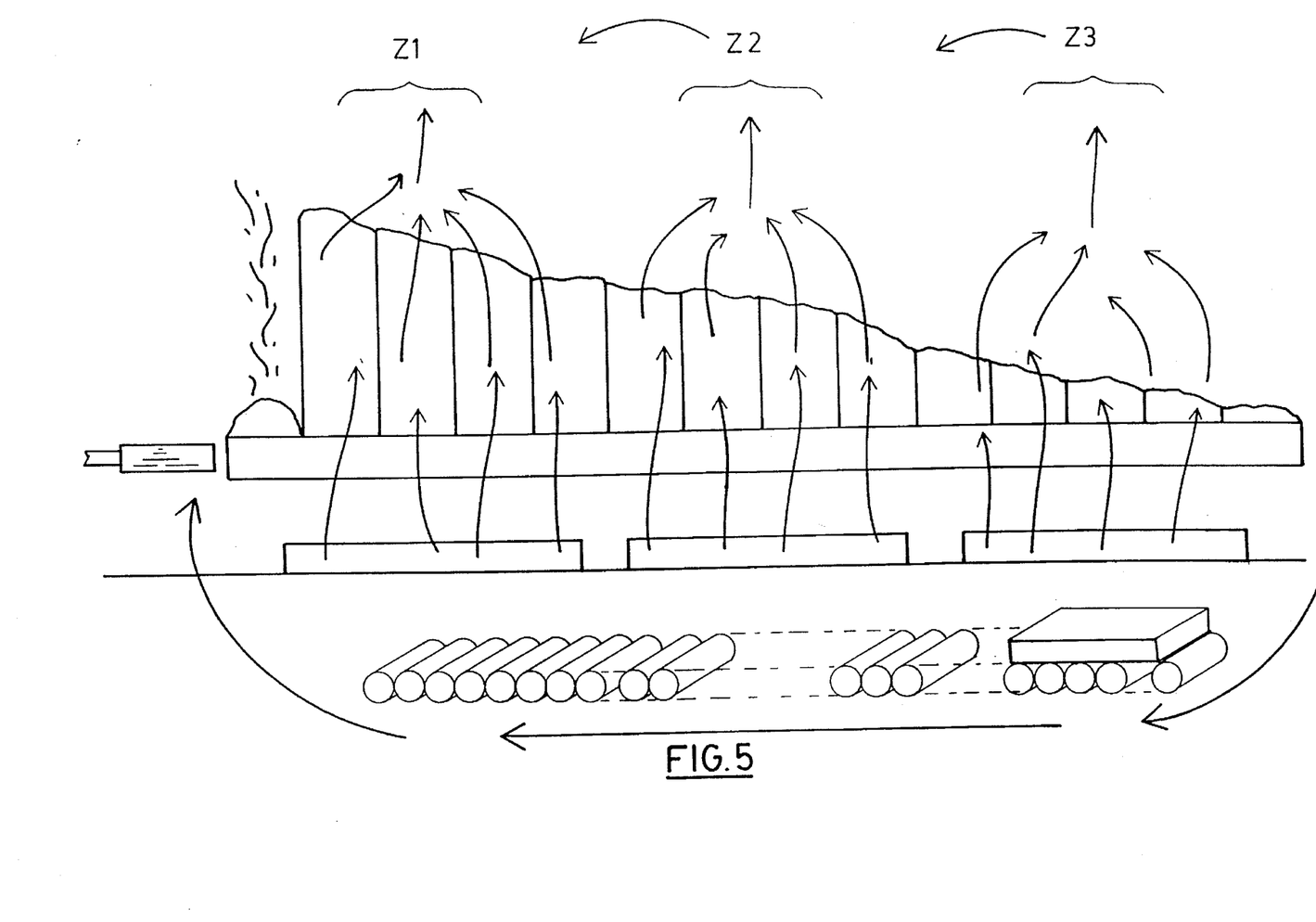
FIG. 5 shows the air flow pattern in the apparatus.

The opposed pair of sidewalls 36 run on tracks 22 carried by the walls 32 of tunnel 12. Conveniently the tracks 22 each comprise a U-section channel (see FIG. 4), the web 35 of which is attached to the respective tunnel wall 32. The web 35 of track 22 is wide enough that the whole height of tray sidewalls 36 may be accommodated within the U-section while resting on carrier U-leg 37a and covered by cover U-leg 37b. The bottom of each tray sidewall 36 may conveniently be provided with a layer of polytetrafluoroethylene or other such material to reduce friction between the trays 24 and the carrier leg 37a of channel 22.

The tunnel 12 and the trays 24 may be sized according to the amount of garbage to be handled. Given that, under good conditions, composting may be achieved within fourteen days, it is convenient to provide one tray per day in the composter. Thus, if 200 pounds of garbage is to be handled per day, the tray size and tunnel size should be such that one tray will accept 200 pounds of garbage. The ram size and ram pressure must clearly also be suitably adjusted to moving the entire train of trays within the tunnel. It is, however, emphasized that a composter according to the invention may be designed for a very small domestic operation or for a very large industrial operation. The mechanics and engineering of tunnels and trays of suitable sizing are well within the scope of a man skilled in the art.

The tunnel 12 is provided with various composting aids along its length. Such as aerators and mixers to loosen and rearrange the garbage. Moreover, means may be provided to recycle at least some of the gases produced during composting, thereby filtering and reducing the total amount of unpleasant, noxious gas.

As illustrated, the tunnel is effectively divided into three zones Z1, Z2 and Z3. An aerator 40 is provided in zone Z1 and again in zones Z2 and Z3. Each aerator 40 comprises a vertical duct 42 extending downwardly outside the tunnel 12 adjacent to sidewall 32. The duct 42 draws air from the exterior through an inlet pipe 44 by means of a fan 46. This air is transported down the duct to below the level of the conveyor trays 24 into a header 43 in the respective zone Z1, Z2, or Z3. From each header 43 the air is distributed through composting garbage in the respective zone. A further fan 48 may be provided at the bottom of the duct 42. Exhaust ducting 48a, b, c, is provided at the top of the tunnel in each zone for the removal of the air and gases produced during composting. Surprisingly, it has been found that the addition of a proportion of the exhaust gases to the aerating gas passed down duct 42 is beneficial to the composting process. The exhaust gases contain an appreciable amount of unused oxygen, and it is possible that, apart from the addition of oxygen, one affect of recycling the exhaust gases is to enhance the lightening effect of the aeration and to help prevention and compaction of the garbage. Another important benefit of using recycled exhaust gases is that the exhaust gases are heated due to the bacterial action in the garbage. In zone 1 where the garbage is fresh and cool, it is possible to use aerating gas which may be as much as 100% recycled exhaust gas. This may help to heat up the garbage to optimum composting temperature. In zone Z3, where bacterial action is substantial, the composting garbage is warm and it may be beneficial to use as much as 100% cool, fresh air to maintain the temperature of the composting process at its optimum.

As soon as the garbage is warm, the aerating gas may include as much oxygen as possible for maximum composting. As the composting progresses the proportion of recycled gas varies dependent on the length of the composting period and the composition of the garbage.

Of course, a varying number of zones may be used in apparatus according to the invention, and the description relating to three zones is exemplary only.

As the compost in trays 24 travels along the tunnel 12 it tends to settle. Moreover, composting may not be even throughout the heap of garbage on each tray. It is, therefore, desirable to mix the material in order to loosen it, aerate it, mix it, and generally improve composting conditions. For this purpose, mixing rollers 60 in one or more zones may be provided extending across the tunnel 12. These mixing rollers 60 may extend from sidewall to sidewall of the tunnel 12 and may have drive shafts supported by bearings on the inner sides of the tunnel to be powered by any convenient means (not shown). As illustrated, two mixing rollers, 60A and 60B are provided one above the other, in the end region of zone Z1, and in the end region of zone Z2. However, it will be appreciated that mixing rollers can be provided at whatever distances along the tunnel are thought suitable.

Figure 1A:
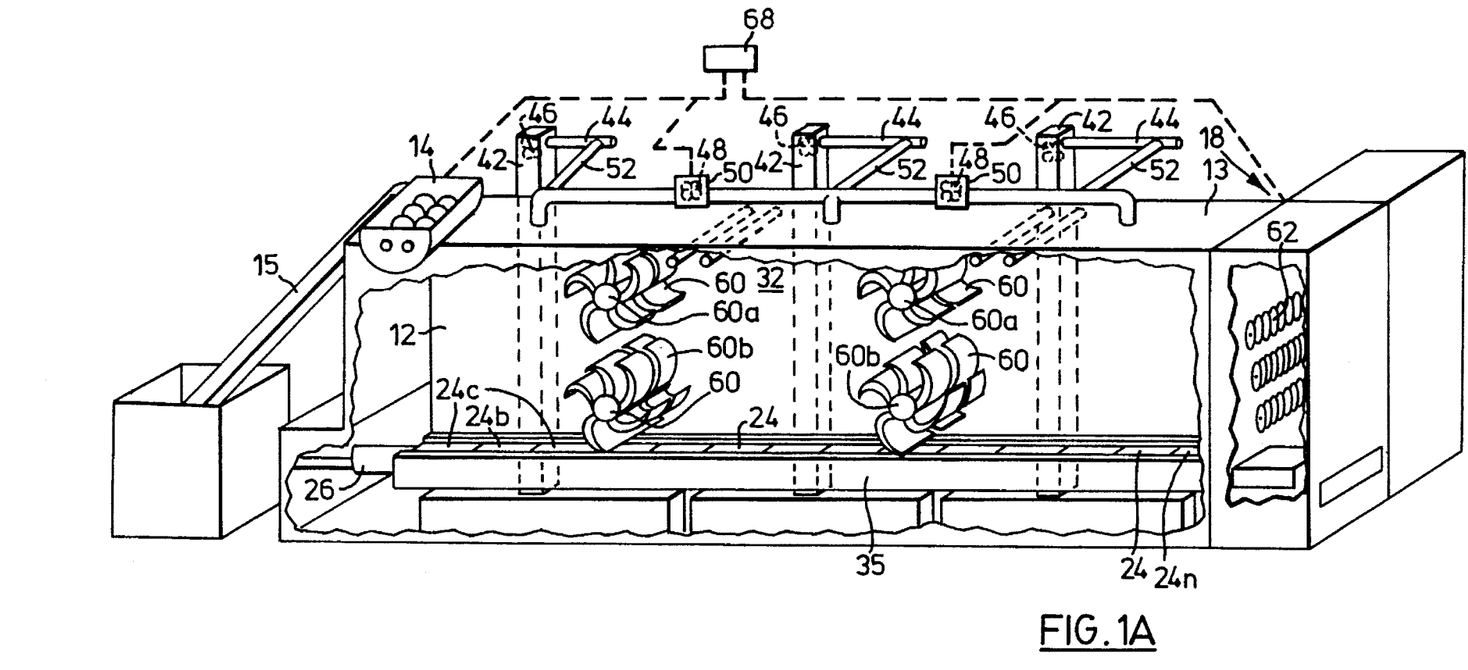
FIG. 1A is a schematic illustration of a composter according to the invention from one side.
Figure 1B:
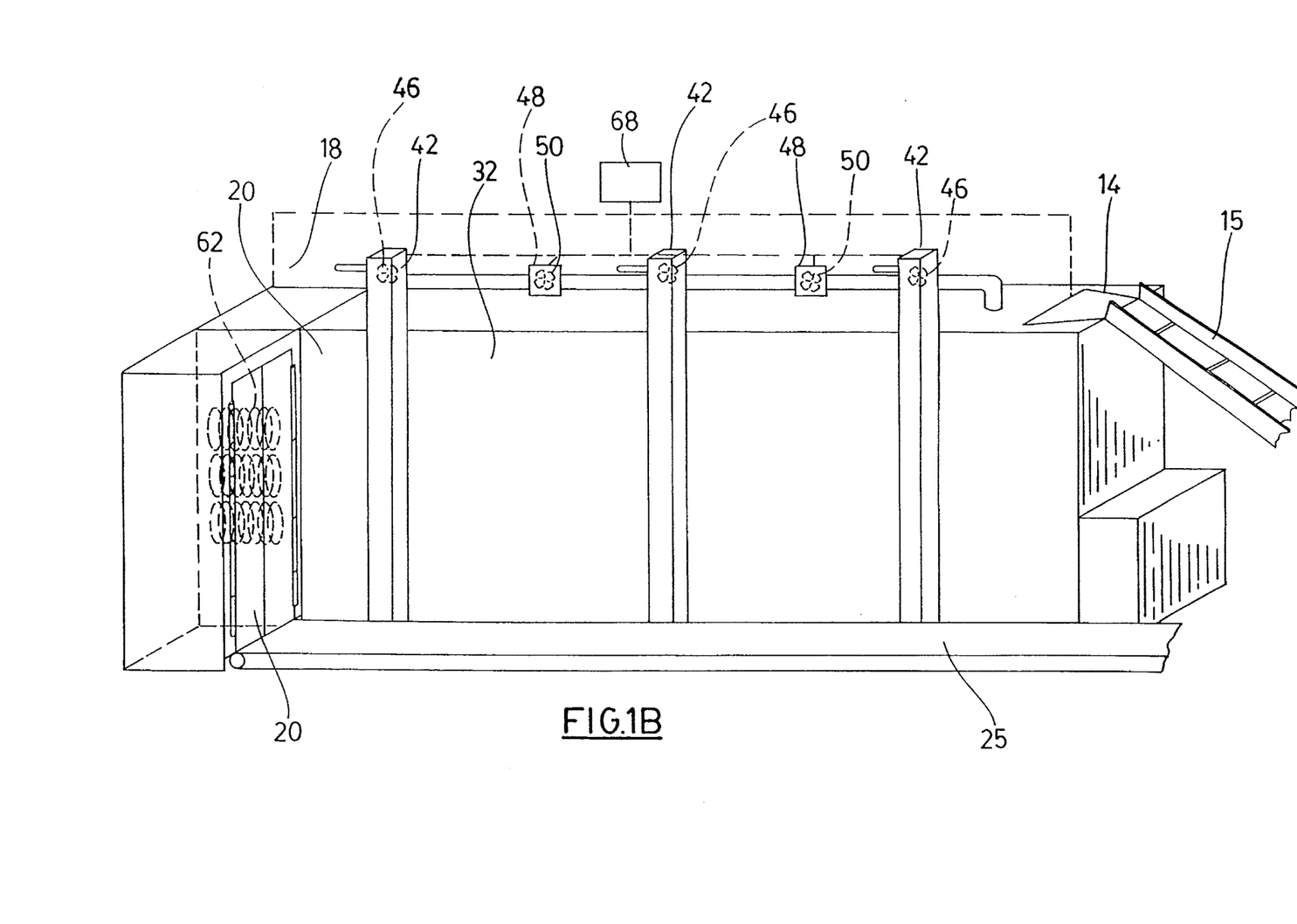
FIG. 1B is a schematic illustration of the composter of FIG. 1A from the other side.
Figure 2:
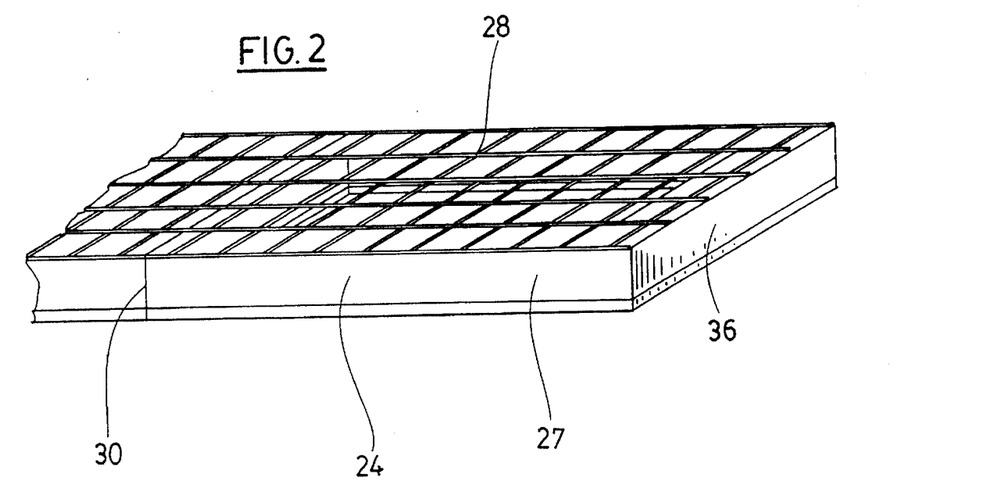
FIG. 2 is an illustration of a movable tray utilizable in a composter such as that of FIG. 1.
Figure 3:
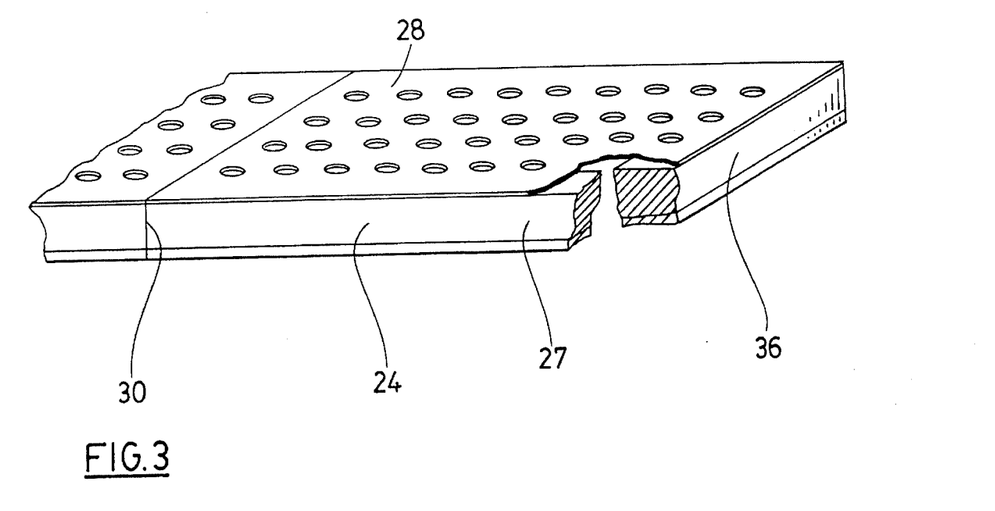
FIG. 3 is an illustration of another movable tray utilizable in a composter such as that of FIG. 1.

The mixing rollers 60 may be of any suitable form and, indeed, need not be rollers but may be any device to mix the compost. As illustrated in FIG. 1A, the rollers 60 are provided with simple paddles 62 to catch and circulate the garbage. The mixing rollers 60 may rotate on drive shafts 64 in similar or opposed directions.

Figure 8:
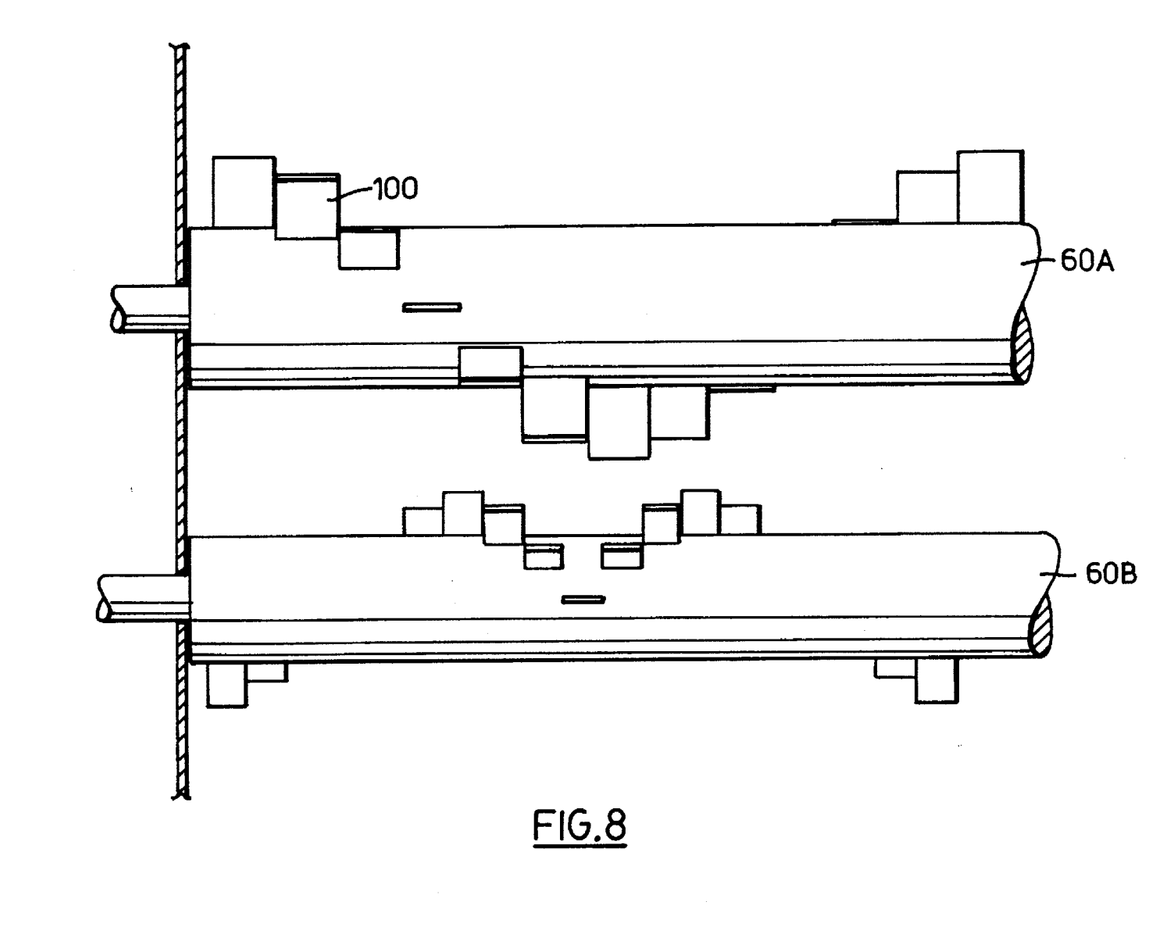
FIG. 8 shows a pair of mixing rollers having paddles spaced from one another to form a helical band.

FIG. 8 illustrates another preferred arrangement and form of paddles, two rollers 60A, 60B being arranged one above the other. To provide for some mixing of garbage in a direction across the tunnel 12, the paddles 100 may project radially from the mixing rollers 60 but be arranged in the path of a single turn helix thereon The angle of the helix may be chosen to direct garbage sideways. More than one helix is present on each roller 60 and, preferably adjacent helixes are of opposite hand to direct garbage in different directions.

The effective overall diameters of rollers 60A and 60B inclusive of paddle height may be different for efficient mixing of garbage. Immediately downstream of the mixing rollers 60, water may be added to promote composting.

Figure 9:
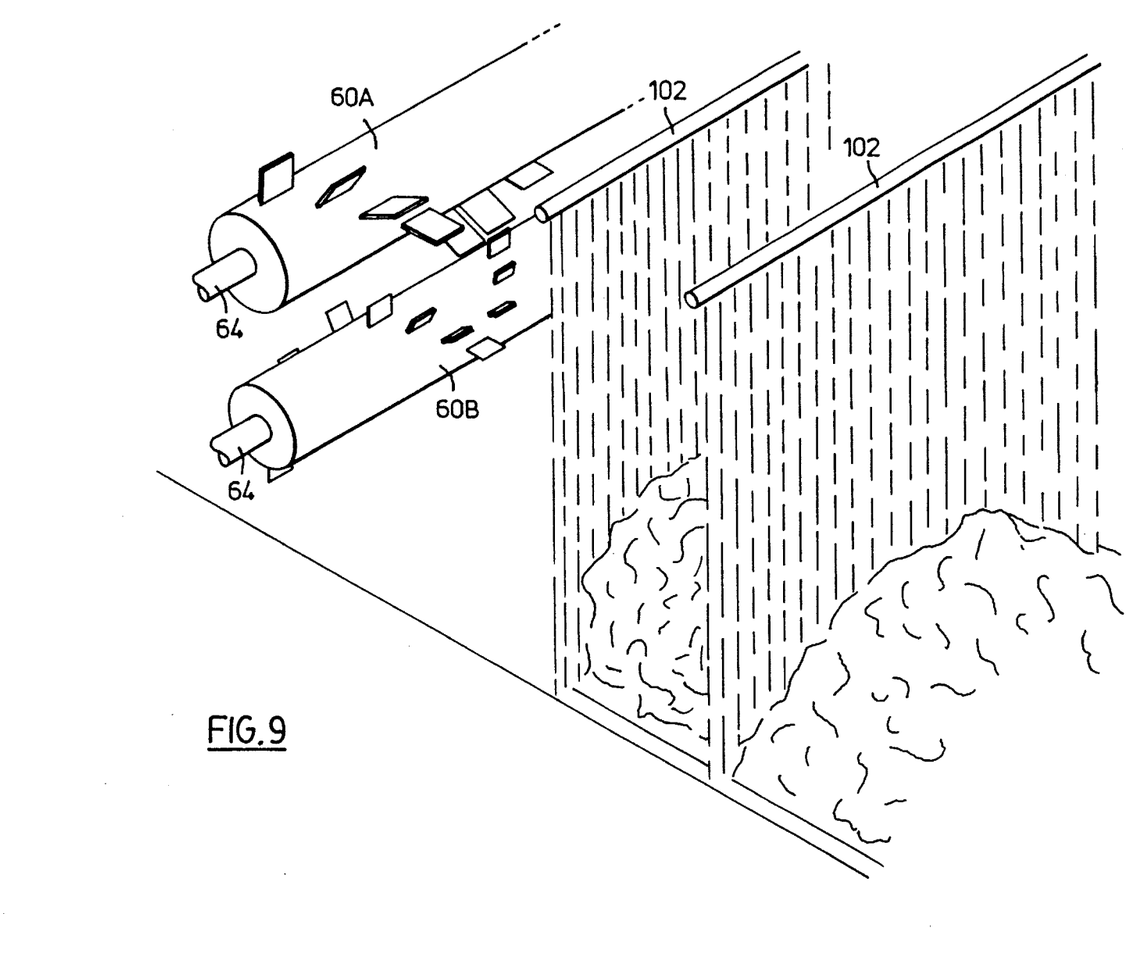
FIG. 9 shows a detail of the water curtains being broken up by disturbed garbage.

Water is conveniently added as a water curtain from spray bar 102 extending across the tunnel 12. It is important that water be added immediately downstream of the mixing rollers while garbage is still loose and disturbed from mixing and not compacted. In practice it is found that two spray bars 102, one spaced downstream of the other are preferred. The disturbed garbage from the paddles 100 of mixing rollers 60 breaks up the water curtains from the spray bars. Appreciably better coverage of the garbage with water is obtained when using at least two spray bars 102. FIG. 9 shows the spray bars 102 but the distance between them and the distance from mixing rollers 60 has been enlarged for ease of illustration. Moreover, it will be appreciated that moving disturbed garbage will churn to and fro through the water curtains over the full height of mixing. The illustration of garbage in FIG. 9 is strictly normal.

At the end of zone Z3, three augers 62 are provided one above the other to transport the formed compost into a side tunnel annex 64. In annex 64 the compost delivered from the augers 62 falls onto a conveyor 25 and is removed through sliding door 66.

The whole process may be subject to computer control by computer 68. Computer 68 calculates and controls the proportions of exhaust gas and fresh aerating gas delivered into each of the zones Z1, Z2 and Z3, and may also control opening and closing of sliding doors 17 and 66. Generally, sliding doors 17 and 66 are only permitted to open when conveyors 20 and 25 respectively are in operation. At all other times, the tunnel is effectively completely sealed. Entry port 21 is provided for the trays 24 and an exit port 20 is also provided; but, when trays 24 are in position within the tunnel 12, the frames effectively block and close the entry and exit ports for the trays. The computer 68 may also ensure that the pressure of aerating gas, with or without an exhaust gas component, is maintained lower than the suction pressure removing exhaust gas. If the pressure within the tunnel is maintained less than the atmospheric pressure, any leaks in the system will not result in the escape of noxious odours.

As the trays progress stepwise through the tunnel the volume of composting garbage decreases. Thus, tray 24a is loaded to within, perhaps, one foot of the roof of tunnel 12. This volume may have decreased to 40% of the original by the time the tray has reached the position of tray 24n. It may be possible by use of the mixers, or by use of additional augers acting longitudinally, to provide some mixing of material from tray to tray without detriment to the composting process. Such mixing may help to move material to maintain a more even level in the tunnel. At least, additional mixing may provide greater aeration and lift and hasten composting in the downstream trays.

The longitudinal and volume dimensions of the tunnel are purely a matter of choice. It is for convenience that the system has been described with reference to a tunnel of length to accommodate fourteen trays, one tray being utilized for each day's garbage. If a regular supply of garbage is available, this system is of convenience to the operator irrespective of the amount of garbage being delivered per day. Thus, if an operator can rely on say, 200 pounds of garbage per day, the system may be designed so that each tray will accommodate 200 pounds of garbage. In such a system there is little need to check whether a tray is being overloaded and whether it is time to install a new tray. It will, however, be appreciated that when the supply of garbage is irregular there will be a need to advance the train of trays only when the tray 24a directly under the hopper 14 is filled to a suitable capacity. The decision as to when this point occurs may be made by visual inspection, or other automated means may be installed to warn the operator that a step forward of the tray train is desirable.

Again, the choice of fourteen days (or fourteen trays) as the length of the tunnel is by no means limiting. Under good conditions compost may be made in fourteen days, but given suitable strength of trays and suitable force of the ram there is no objection to compost remaining in the tunnel for a greater length of time. This will, of course, extend the length of the tunnel beyond that minimally necessary.

I claim:

1. A method of continuous composting comprising depositing garbage into a closed composting tunnel for bulk undivided garbage through an inlet in a top surface of the tunnel in the region of a first end into a trough in a first position comprising an elongate section of a cylinder having a mouth opening upwardly, an elongate bottom and end walls, the trough being located across the top surface of the tunnel below the inlet for garbage and, in its first position forming a barrier between the interior and exterior of the tunnel;

blending garbage in the trough in a first position of the trough using blending augers extending between the end wall of the trough;

tilting the trough about a longitudinal axis to a second position so that the mouth opens downwardly to empty garbage onto a flat foraminous tray located beneath the trough being the furthest upstream tray of a row of unattached trays on a track running longitudinally within the tunnel, and returning the trough to its first position to receive further garbage;

moving the trays longitudinally stepwise within the tunnel by shunting trays in discrete steps by operation of a ram against an upstream shunting surface of a frame the furthest upstream tray, the ram having a stroke equivalent to the longitudinal width of a tray whereby each step is equivalent to the longitudinal width of a tray whereby each step is equivalent to said width of the tray, to create space upstream of the trays for location of a further upstream tray and to eject a downstream tray from an outlet in a second end of the tunnel;

subjecting garbage in the tunnel to mixing downstream of the furthest upstream tray;

aerating garbage in the tunnel through foraminous bases of the trays; and removing exhaust air through ducting.

2. A method as claimed in claim 1 in which rubber crumb is blended with the garbage in the trough and composted in the composting tunnel.

3. A method as claimed in claim 2 in which the rubber crumb has a particle size of from ¼ inch to ¾ inch.

4. A method as claimed in claim 2 in which the rubber crumb is blended into the garbage in a proportion of up to 30% by volume.

5. A method as claimed in claim 1 in which the garbage is mixed by mixing rollers extending across the tunnel, the mixing rollers having paddles arranged to cause some mixing of the garbage in a direction across the tunnel.

6. A method as claimed in claim 1 in which water is added to mixed garbage downstream of mixing.

7. A method as claimed in claim 6 in which water is added from a pair of spaced apart spray bars in a top part of the tunnel and bars extending across the tunnel.

* * * * *